UNITED STATES PATENT OFFICE.

LEO WALLERSTEIN, OF NEW YORK, N. Y.

PROCESS OF TREATING FERMENTED BEVERAGES.

995,821. Specification of Letters Patent. Patented June 20, 1911.

No Drawing. Application filed June 3, 1909. Serial No. 500,005.

*To all whom it may concern:*

Be it known that I, LEO WALLERSTEIN, a subject of the Emperor of Germany, residing at New York, in the county of New York and State of New York, have invented certain new and useful Improvements in Processes of Treating Fermented Beverages, of which the following is a specification.

The object of this invention is the provision of a process of preparing fermented beverages, such as beers and ales, which even when pasteurized and then chilled will keep their brilliancy, and which after pasteurization will be free from the so-called "pasteurized taste".

As it well known, most beers and ales are submitted after bottling to pasteurizing, an operation also known as steaming, whereby micro-organisms such as yeast and bacteria which may be present therein are either killed or so weakened as to arrest their further development. This operation as commonly practiced consists in subjecting the bottled beer or ale for a short time to temperatures between 135° and 154° F. Beverages so treated possess a characteristic taste commonly referred to as the "pasteurized taste," and are particularly liable to cloud when chilled. Beverages treated in accordance with the present invention, even after pasteurization, are found to be free from both of these objectionable characteristics.

I may proceed as follows, the process being substantially the same for beer and ale: The beer, for example, is heated before bottling to a temperature above 120° F., and preferably to a temperature approximating 154° F., and is thereafter cooled to a temperature of 34° F., or somewhat lower, that is to say to a temperature of about 30° F. approximating but above the freezing point (28-29° F.) of the beer. At this temperature the albumenoids which would otherwise cloud the beer when chilled are precipitated, and these are at once removed by filtration, the beer being filtered at or near this reduced temperature. The clear product may then be carbonated and treated as is usually practiced in the art. The effect of the preliminary heating is so to modify the albumenoids that they are capable of substantially complete precipitation during the subsequent cooling.

As a modified procedure I may carbonate the beer or ale after heating as above described and before filtering out the precipitated albumenoids. The carbon dioxid introduced into the cold beer is found to reduce the solubility of the albumenoids and to facilitate their removal.

Beer or ale treated by either of the above methods may be bottled and pasteurized as usual, and will be found to be free from the so-called pasteurized taste and to retain its full brilliancy when chilled or placed on ice.

I claim:

1. The process of treating fermented beverages which consists in heating the same to a temperature above 120° F., to modify the albumenoids, cooling the liquor to an extent sufficient to precipitate the modified albumenoids, removing the precipitated albumenoids, bottling the clear liquor, and pasteurizing it.

2. The process of treating fermented beverages which consists in heating the same to a temperature above 120° F., to modify the albumenoids, cooling the liquor to an extent sufficient to precipitate the modified albumenoids, carbonating the cooled liquor, removing the precipitated albumenoids, bottling the clear liquor, and pasteurizing it.

In testimony whereof, I affix my signature in presence of two witnesses.

LEO WALLERSTEIN.

Witnesses:
W. GRAF,
B. STOLLER.